United States Patent
Pascali et al.

(10) Patent No.: US 11,561,939 B2
(45) Date of Patent: Jan. 24, 2023

(54) ITERATIVE DATA PROCESSING

(71) Applicant: AMADEUS S.A.S., Biot (FR)

(72) Inventors: Alessandro Pascali, Biot (FR); Giorgio Calandriello, Biot (FR); David Renaudie, Biot (FR); Matthieu Gardeux, Biot (FR)

(73) Assignee: AMADEUS S.A.S., Biot (FR)

( * ) Notice: Subject to any disclaimer, the term of this patent is extended or adjusted under 35 U.S.C. 154(b) by 311 days.

(21) Appl. No.: 16/685,044

(22) Filed: Nov. 15, 2019

(65) Prior Publication Data

US 2020/0159703 A1 May 21, 2020

(30) Foreign Application Priority Data

Nov. 16, 2018 (FR) ...................................... 1860593

(51) Int. Cl.
*G06F 16/00* (2019.01)
*G06F 16/21* (2019.01)
*G06F 16/23* (2019.01)
*G06F 16/2453* (2019.01)

(52) U.S. Cl.
CPC ........ *G06F 16/211* (2019.01); *G06F 16/2379* (2019.01); *G06F 16/24539* (2019.01)

(58) Field of Classification Search
CPC ............... G06F 16/211; G06F 16/2379; G06F 16/24539
See application file for complete search history.

(56) References Cited

U.S. PATENT DOCUMENTS

| | | | |
|---|---|---|---|
| 7,822,712 | B1 | 10/2010 | Robinson et al. |
| 11,157,502 | B1 * | 10/2021 | Chen .................... G06F 16/2456 |
| 2011/0137875 | A1 | 6/2011 | Ziauddin et al. |
| 2013/0159832 | A1 * | 6/2013 | Ingargiola .............. G06Q 40/00 |
| | | | 715/220 |

(Continued)

OTHER PUBLICATIONS

Palpanas, Themistoklis, et al. "Incremental maintenance for non-distributive aggregate functions." VLDB'02: Proceedings of the 28th International Conference on Very Large Database (pp. 802-813) Morgan Kaufmann, Aug. 20, 2022.

(Continued)

*Primary Examiner* — Tyler J Torgrimson
(74) *Attorney, Agent, or Firm* — Perry + Currier

(57) ABSTRACT

Data is processed iteratively by a database system with a first cache storing key-value data which resulted from previous iterations of processing input data and a second cache storing aggregated data which resulted from previous iterations of processing key-value data stored in the first cache. In a current iteration, the database system receives further input data related to the input data of the previous iterations, transforms the further input data into further key-value data and stores the further key-value data in the first cache in addition to the stored key-value data which resulted from previous iterations. The database system further processes the further key-value data and the aggregated data stored in the second cache to form updated aggregated data, and stores the updated aggregated data in the second cache for usage in further iterations. The database system also provides the updated aggregated data to at least one client.

15 Claims, 7 Drawing Sheets

(56) References Cited

U.S. PATENT DOCUMENTS

| | | | | |
|---|---|---|---|---|
| 2016/0092540 | A1* | 3/2016 | Bihani | G06F 16/256 |
| | | | | 707/624 |
| 2017/0083588 | A1 | 3/2017 | Lang et al. | |
| 2020/0019546 | A1* | 1/2020 | Luo | G06F 16/245 |
| 2021/0073808 | A1* | 3/2021 | Gu | G06F 16/2379 |

OTHER PUBLICATIONS

Haines, Steve. "Map Reduce in HBase, HBase Data Analysis with MapReduce,InformIT." InformIT, Nov. 26, 2014, URL: http://www.informit.com/articles/article.aspx?p+2262143&seqNum=2.

* cited by examiner

ITERATIVE DATA PROCESSING

CROSS-REFERENCE TO RELATED APPLICATION

This application claims priority from French Patent Application No. 1860593 filed Nov. 16, 2018, the contents of which is hereby incorporated by reference.

FIELD

The present subject-matter generally relates to information technology. More specifically, it is directed to database technology and mechanisms for processing data in a database environment.

BACKGROUND

One functionality of database systems, such as database systems implementing big data applications, is to process raw data in order to provide results of the processing to further platforms such as search platforms or clients. Raw data processing often involves a significant amount of data and is to be completed within a certain processing time with reasonable hardware resources. Hence, solutions are sought to realize raw data processing in an efficient way in terms of computation resource efficiency.

Mechanisms such as the known MapReduce framework, e.g. referred to by US 2017/0083588 A1, allow processing acceleration by parallelizing processing stages and executing these stages in distributed manner. Processing is broken down into partial sub-problems and the sub-problems are processed by respective local nodes. Results of the local processing is then aggregated in order to form the combined result. The local Map procedure implements a first part of the local processing and generates key-value data (e.g. breaking a line into words), while the Reduce procedure provides a summary function (counting the words recognized by the Map function). MapReduce orchestrates the processing by marshalling distributed local nodes, running various tasks in parallel, managing all communications and data transfers between the various parts of the system, and providing for redundancy and fault tolerance.

SUMMARY

According to a first aspect, a method of iteratively processing data in a database system is provided. The database system includes a first cache storing key-value data which resulted from previous iterations of processing input data and a second cache storing aggregated data which resulted from previous iterations of processing key-value data stored in the first cache. In a current iteration, the database system receives further input data related to the input data of the previous iterations. The database system transforms the further input data into further key-value data and stores the further key-value data in the first cache in addition to the stored key-value data which resulted from previous iterations of processing input data. The database system further processes the further key-value data and the aggregated data stored in the second cache to form updated aggregated data, and stores the updated aggregated data in the second cache for usage in further iterations. The database system also provides the updated aggregated data to at least one client.

According to a second aspect, a corresponding database system arranged to execute the method is provided.

According to a third aspect, a computer program stored on a storage medium is provided which, when executed by a computation machine, equips the computation machine with the corresponding functionality.

Further optional aspects are set forth as well.

BRIEF DESCRIPTION OF THE FIGURES

The present mechanisms will be described with reference to accompanying figures.

Similar reference numbers generally indicate identical functionally similar elements.

DETAILED DESCRIPTION

As already outlined at the outset, the methodologies described herein relate to database environments and systems which offer processed data to clients. The term "database" is meant to encompass any types of structured information storage system such as standard stand-alone databases like SQL Server® or Oracle® databases as well as more complex, distributed and/or proprietary storage systems (e.g. Cloudera® or MapR® or HortonWorks® Hadoop, Spark, Hive, Apache Hadoop® Distributed File System (HDFS), etc.), relational databases including database management systems or object-oriented database systems and the like.

The database provides processed data to client entities such as user terminals, applications (e.g. browsers installed on user terminals etc.) or other databases. Data provision is either effected by requests from a client, by unsolicited transmission from database to the client (push) or any other way of electronic data transmission.

Figure 1:
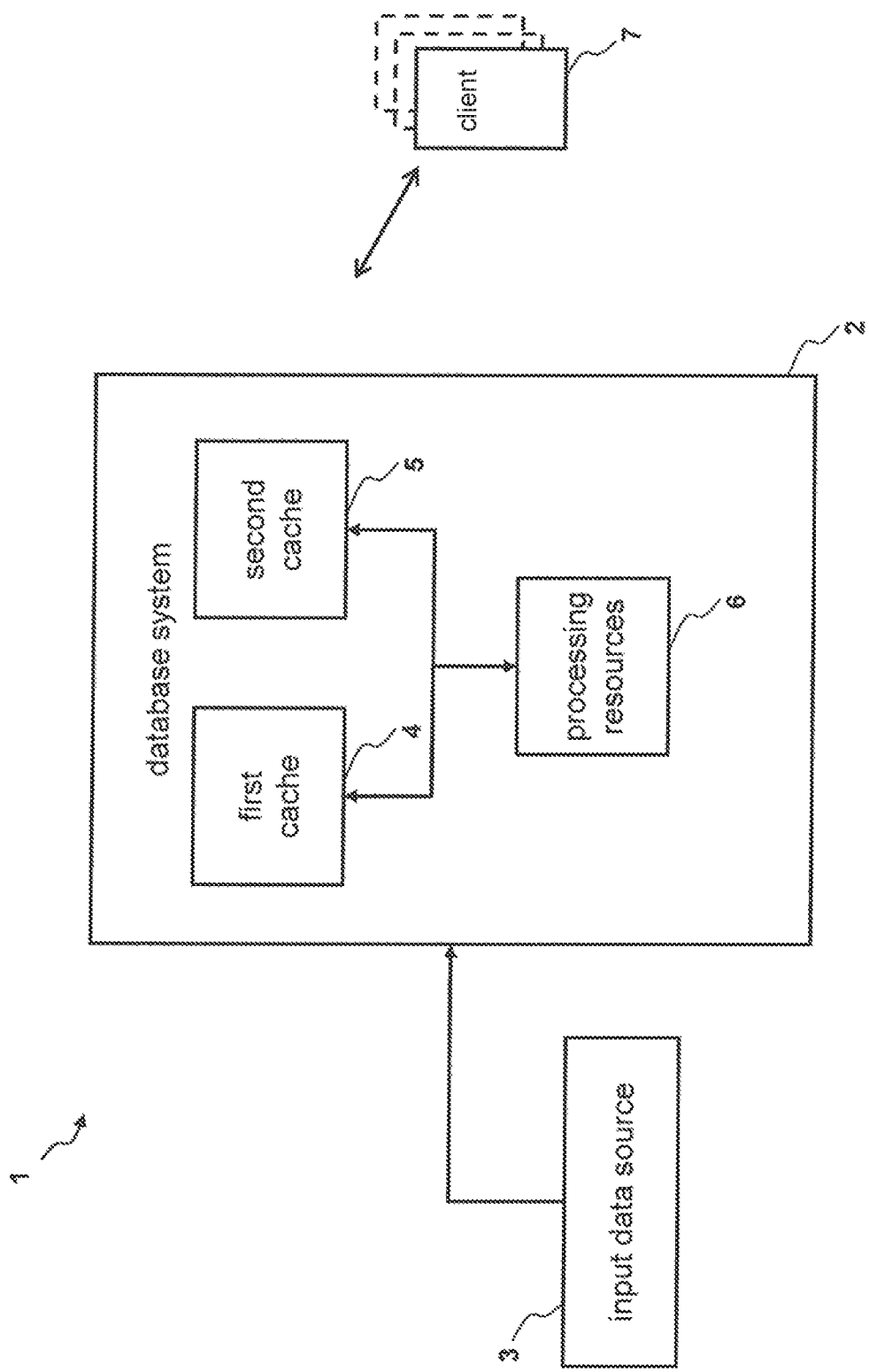
FIG. 1 schematically shows a database system in accordance with embodiments.

FIG. 1 illustrates a database environment 1 at a schematic level. A database system 2 receives input data from an input data source 3. Compared to the data held and output by the database system 2, the input data received from the input data source 3 is unprocessed (raw) data. In other words, the input data received from the input data source 3 is first subject to data processing by the database system 2 before processed data is provided by the database system 2 to one or more clients 7. In this sense, the database system 2 operates as a data processing mediator transforming raw input data into processed data required by the clients 7. The input data source is e.g. a further database system, any other station being capable of storing and transmitting data or any storage medium which can be read and processed by the database system 2.

Processing the input data obtained from the input data source 3 is effected by the database system 2 by utilizing processing resources 6. Processing resources 6 include at least one processing unit (e.g. a central processing unit, CPU) with corresponding memory (e.g. a hierarchical cache structure and optional further working memory), but generally includes a plurality of processing units and/or computation nodes (cf. FIG. 3 discussed further below) in order to be capable to process the input data in a parallel manner. In some embodiments, these computation nodes are distributed over a plurality of machines (e.g. computers, servers), rendering the database system 2 to be a distributed database system.

As will be explained in more detail further below, the database system 2 also includes two caches to facilitate the processing of the input data. The first cache 4 is also referred to as key-value cache and stores key-value data which is the result of a first transformation on the basis of the input data. As generally known to the skilled person, key-value data refers to a data model according to which data is expressed as a collection of 2-tuples in the form <attribute name, value> with each element being an attribute-value pair. The second cache 5 is also referred to as aggregation cache and stores aggregated data which is the result of a second transformation on the basis of the key-value data stored in the first cache. Aggregation refers to executing an aggregate function by using at least a part of the key-value data stored in the first cache as input parameter. Non-limiting examples of aggregation are basic functions such as average, moving average, count, maximum, minimum, sum, standard deviation, top n value, concatenation, median, rank, etc. as well as more complex aggregate functions which are composed of combinations of the basic aggregate functions.

The key-value cache 4 and the aggregation cache 5 may be implemented as logical caches, i.e. held in respectively assigned areas of a memory of the hardware machine(s) which host(s) the database system 2. For example, the key-value cache 4 may be kept in a first working memory portion or disk portion of the hardware machine(s) and the aggregation cache may be kept in a second working memory portion or disk portion of the hardware machine(s).

Figure 2:
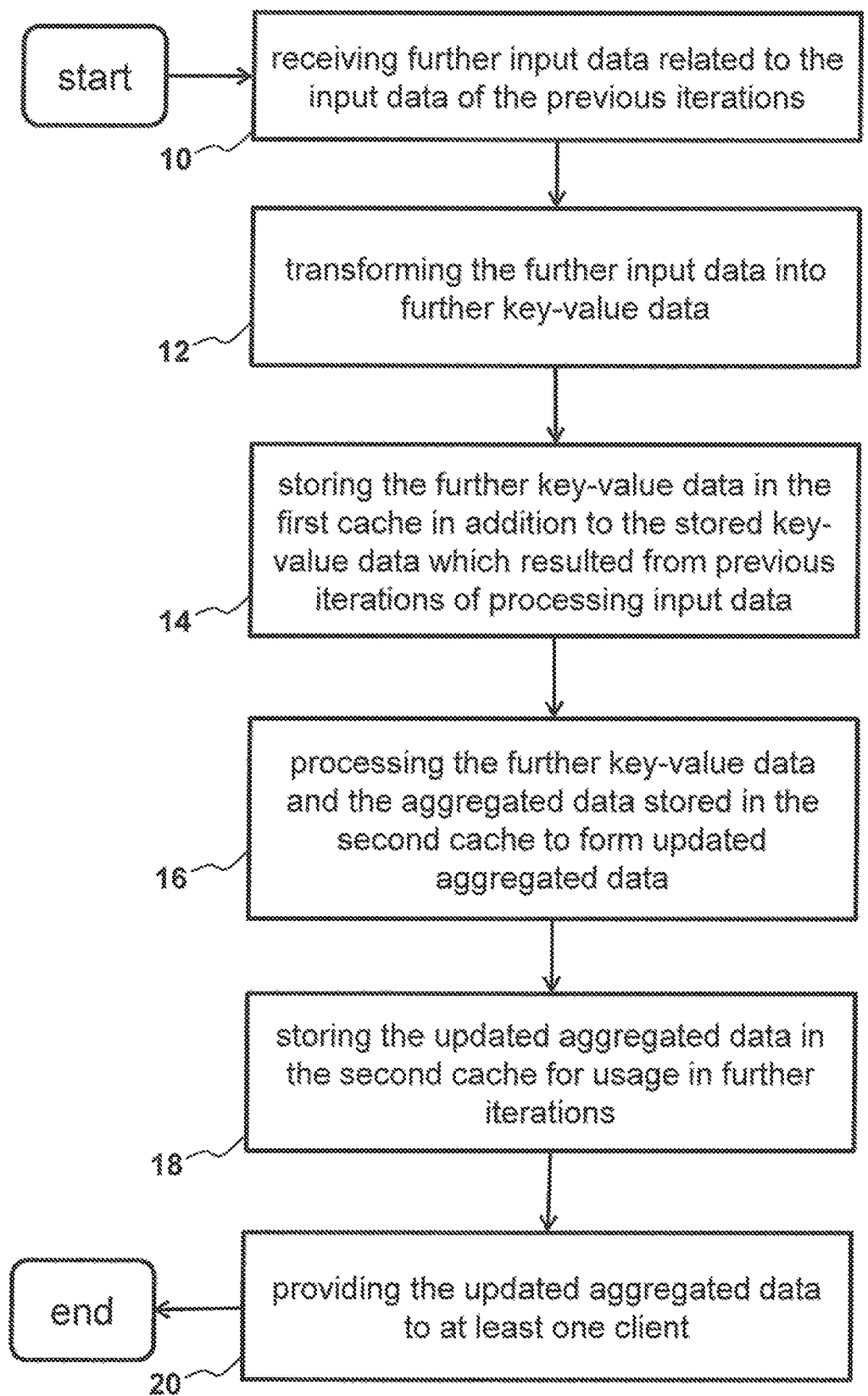
FIG. 2 visualizes a process of data processing as described herein at a general level.

FIG. 2 refers to a general process performed by and to a functionality of the database system 2 as described herein. Generally, the database system 2 processes data iteratively, i.e. certain input data is provided to the database system 2 and processed in a first iteration, certain further input data is provided to the database system 2 at a later point of time and then processed in a next iteration, and so forth. FIG. 2 visualizes a current iteration, i.e. an iteration considered at a certain point of time. At 10, the database system 2 receives further input data related to the input data of the previous iterations. At 12, the database system 2 transforms the further input data into further key-value data and, at 14, stores the further key-value data in the first cache 4 in addition to the stored key-value data which resulted from previous iterations of processing input data. At 16, the database system 2 processes the further key-value data and the aggregated data stored in the second cache 5 to form updated aggregated data. At 18, the database system stores the updated aggregated data in the second cache 5 for usage in further iterations. At 20, the database system 2 provides the updated aggregated data to at least one client 7.

More specifically with respect to the two activities/functions 12 and 14, an exemplary database system 2 receives a set of a number data records each given period of time such as day, i.e. one iteration is performed per day (note that the given period of time can be longer or shorter depending on the use case, e.g. one second or less, in the order of minutes such as ten minutes, hours, or longer—the following example of one day is thus not limiting and used for illustration purposes only). For example, at day 40, the database system 2 has received 39 sets of data records before on the previous 39 days and now receives a $40^{th}$ set of data records. In a prior art approach, the database system 2 stored the 39 previously received sets of data records and transforms all sets of data records, i.e. the 39 previously received sets and the $40^{th}$ newly received set of data records into corresponding key-value data. According to the present system, however, the transformed key-value data of the previously received 39 sets of data records have already stored beforehand (over the 39 last days) in the key-value cache 4, so only the newly received $40^{th}$ set of data records needs to be transformed to key-value data during the current iteration at day 40.

Maintaining the cumulated key-value data from various previous iteration and adding the key-value data of the current iteration, which is generated based on the currently received input data, in the key-value cache 4 facilitates working in a distributed environment (e.g. by employing the MapReduce data processing paradigm as explained in more detail further below) because multiple processing nodes can be served/fed by the key-value cache 4. Generally, the key-value cache 4 also constitutes a repository for any subsequent data aggregation or further processing on top of the key-value data generated from the input data over various iterations.

Furthermore, in the event of a technical corruption at the aggregation cache 5, restoring the overall content of the aggregation cache 5 might require the cumulated key-value data from previous iterations which is available by the key-value cache 4, while the input data from the previous iterations might not be available anymore and, in fact, does not need to be available anymore. Hence, in some embodiments, the database system 2, at the current iteration, discards the input data received from the input data source 3 during this iteration after the transformation into the key-value data and storage of the key-value data in the key-value cache 4 (activity 12) has been concluded.

More specifically with respect to the two activities/function 16 and 18, in addition to activities/functions 12 and 14, and with continuing reference to the 40-day example above, it has been noted that a prior art database system, during a given iteration (e.g. at day 40), performs a data aggregation on the basis of the key-value data from previous iterations and the current iteration, but the key-value data from the previous iterations (i.e. from the 39 previous days in the given example) is identical to the latest iteration. Hence, a prior art system would make identical computations to a large extent as in the previous iteration (39 out of 40 set of data records) in order to make the aggregations.

On the other hand, the present database system 2 only processes the key-value data generated in the current iteration (the day 40 key-value data in the given example) and, to the other extent, re-uses the aggregated data from previous iterations already available in the aggregation cache 5. Hence, processing activity/function 16 effectively results in an update, addition or extension (depending on the specificities of the aggregation, e.g. average values are updated, while e.g. concatenations are extended) of the aggregated data as opposed to an entire re-computation of the aggregated data. Further exemplary details of the aggregation activity/functions 16 and 18 are set forth further below.

Figure 3:
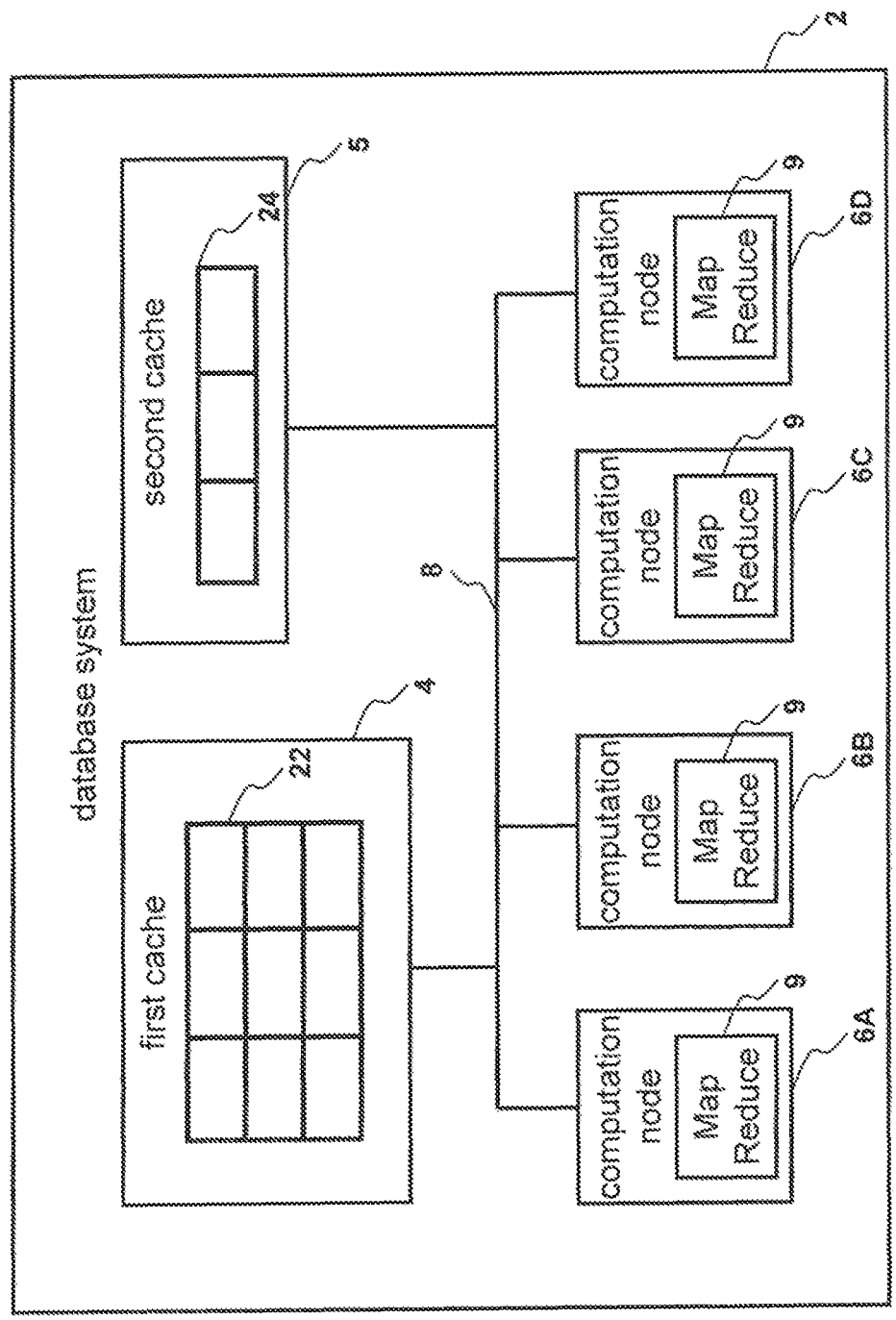
FIG. 3 shows a more detailed example of a database system with a first and second cache.

In some embodiments, with reference to FIG. 3, transforming the further input data into further key-value data is a Map process of a MapReduce data processing and processing the updated key-value data in the first cache 4 including the further key-value data and the aggregated data stored in the second cache 5 is a Reduce process of the MapReduce data processing.

MapReduce is a programming model and an associated implementation for processing and generating big data sets with a parallel, distributed algorithm on a cluster. A MapReduce program is composed of a map procedure (or method), which performs filtering and sorting (such as sorting students by first name into queues, one queue for each name), and a reduce method, which performs a summary operation (such as counting the number of students in each queue, yielding name frequencies).

The MapReduce framework is particularly advantageous for facilitate distributed and parallel processing. Thus, in some embodiments employing MapReduce, the database system 2 comprises a plurality of computation nodes 6. FIG. 3 is a non-limiting example with four computation nodes 6A, 6B, 6C and 6D. Hence, a plurality of Map processes and the Reduce processes are respectively executed in a parallelized manner distributed across at least two of the plurality of computation nodes 6.

In the example of FIG. 3, all four computation nodes 6A, 6B, 6C, 6D comprise a functional MapReduce component 9 and, thus, Map processes and Reduce processes are executed at all four computation nodes 6A, 6B, 6C, 6D. A functional MapReduce component 9 is a software computer program executed by a computation node 6. More specifically, in response to the arrival of input data of a current iteration at the database system 2 (activity/function 10 of FIG. 10), the Map processes implemented by the MapReduce components 9 of the computation nodes 6 perform activities/functions 12 and 14 as described above with reference to FIG. 2 in a distributed and parallel manner, i.e. transform the input data received in the current iteration into key-value data 22 and store the generated key-value data 22 in the key-value cache 4, in addition to the key-value data 22 already stored from previous iterations. Further, the Reduce processes implemented by the MapReduce components 9 of the computation nodes 6 perform activities/functions 16 and 18 as described above with reference to FIG. 2 in a distributed and parallel manner, i.e. process the newly generated key-value data 22 stored in the key-value cache 4 as well as the aggregated data 24 stored in the aggregation cache 5 forming updated aggregated data 24 and store the updated aggregated data 24 in the aggregation cache 5.

Data access and exchange between the computation nodes 6 and both, the first cache 4 and the second cache 5, is enabled by an interface 8, such as a data/address bus (insofar the computation nodes 6 of the database system 2 are arranged within the same computing machine) or a network (insofar the computation 6 are distributed across several computing machines).

Figure 4:
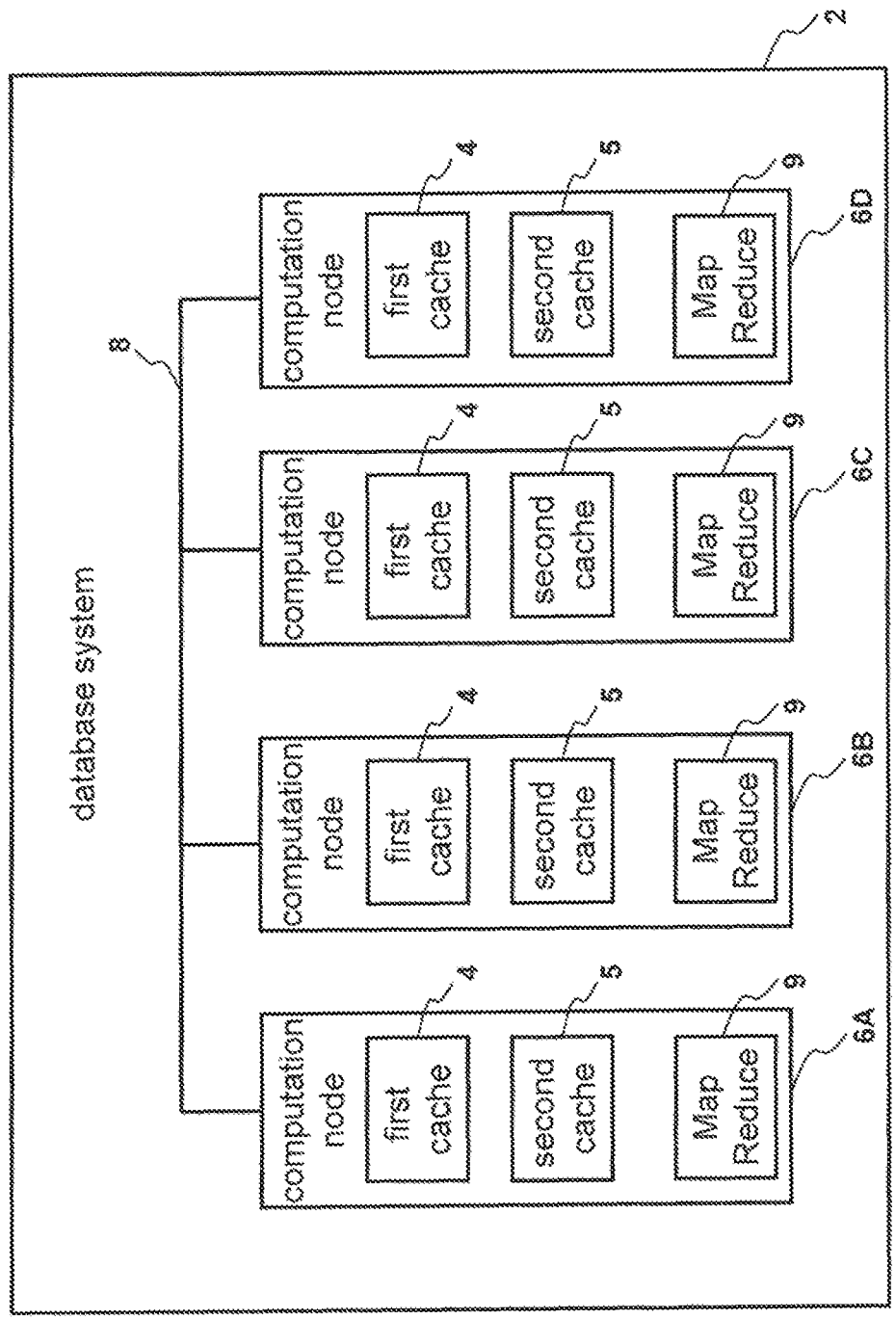
FIG. 4 shows a further more detailed example of the database system with a distributed first and second cache.

In some embodiments, now with reference to FIG. 4, the first cache 4 and/or the second cache 5 are also distributed over a plurality of computation nodes 6. Hence, in these embodiments, at least two computation nodes 6 maintain a logical part of the first cache 4 and/or of the second cache 5. For example, in some implementations, as also described further below, the first cache 4 and/or the second cache 5 are constituted by one or more files which are accessible by means of a file system. In the distributed example of FIG. 4, a distributed file system such as the HDFS which allows for a physical distribution of the files of the first cache 4 and/or the second cache 5 among a plurality of computation nodes 6 and provides an interface to read/write the files in a seamless way.

In some embodiments, the key-value data 22 is stored in the form of one or more files, such as one or more Extended Markup Language (XML) file(s) or JavaScript Object Notation (JSON) file(s). However, XML and JSON do not specifically facilitate the iterative processing as described above as well as various aggregation computations. Further, reading and decoding XML or JSON files requires an amount of computation resources. Therefore, in some embodiments, now with reference to FIGS. 5 and 6, the key-value data 22 stored in the first cache 4 is organized sequentially in that the key comprises a creation date of the respective key-value data record. This is irrespective of the storage format of the key-value data 22, i.e. whether the key-value data 22 is stored in one or more files (e.g. XML, JSON, Parquet) or, for example, in a relational database.

Figure 5:
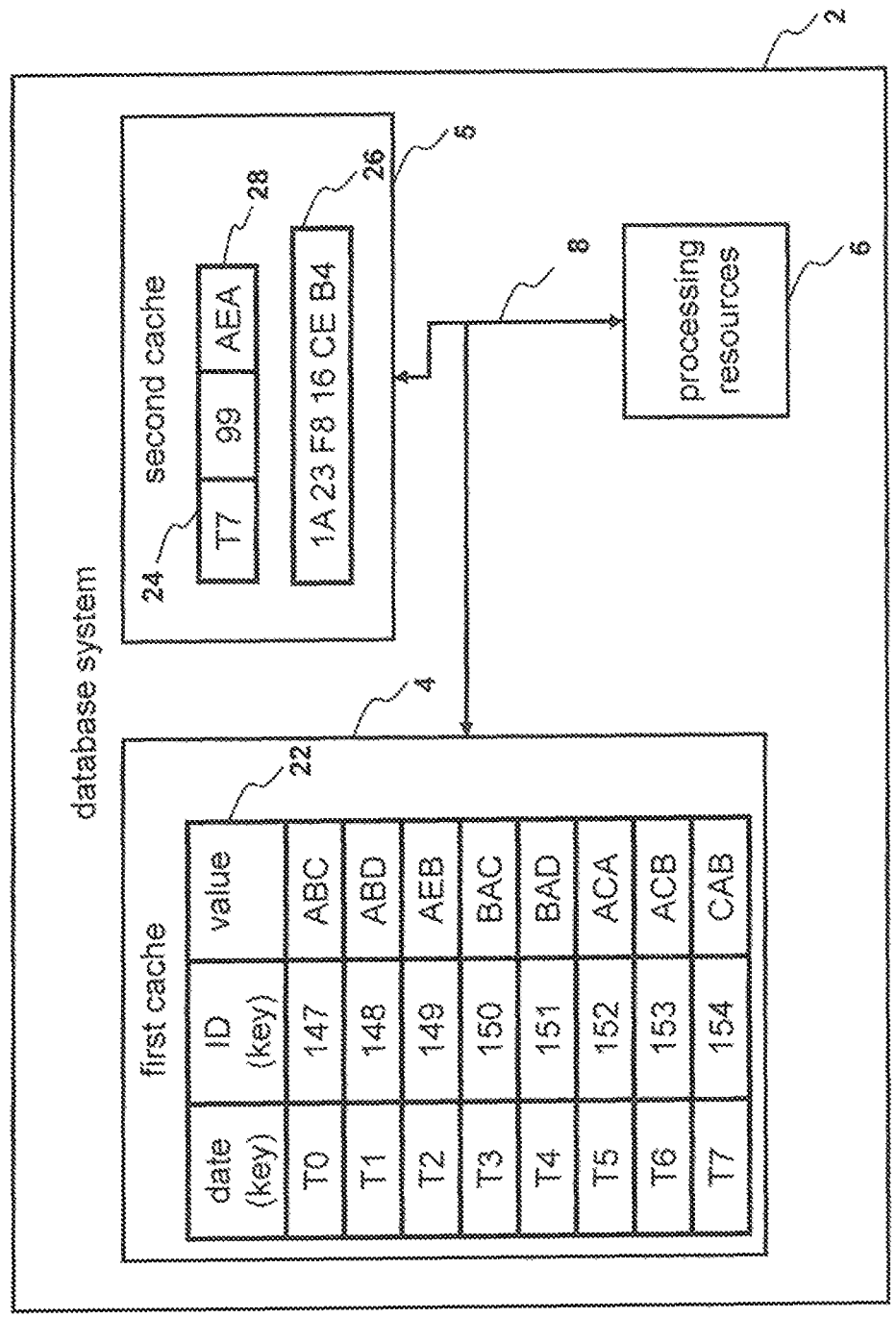
FIG. 5 depicts a particular example of data processing utilizing the first and second cache.

As shown in the example of FIG. 5, the key-value data 22 records stored in the key-value cache 4 may be structured in that they comprise a date or timestamp, an ID and a value (representing one or more values). The key uniquely identifying a record may be given by both, the date and the ID. The granularity of the date may be the iteration, i.e. the day of the current iteration in the 40 days example set out above. The value of the key-value data may also be given by XML or JSON format. Compared to usual XML- or JSON-based technology, such data or file structure causes less disk access overhead and, thus, reduces disk I/O operations as well as network load. Further, including the date in the key of the key-value data 22 in the key-value cache 4 facilitates easy (processing resources-efficient) access to the key-value data 22 in order to perform aggregation functions. For example, join operations which may require working only on the key do not decode a JSON file.

Figure 6:
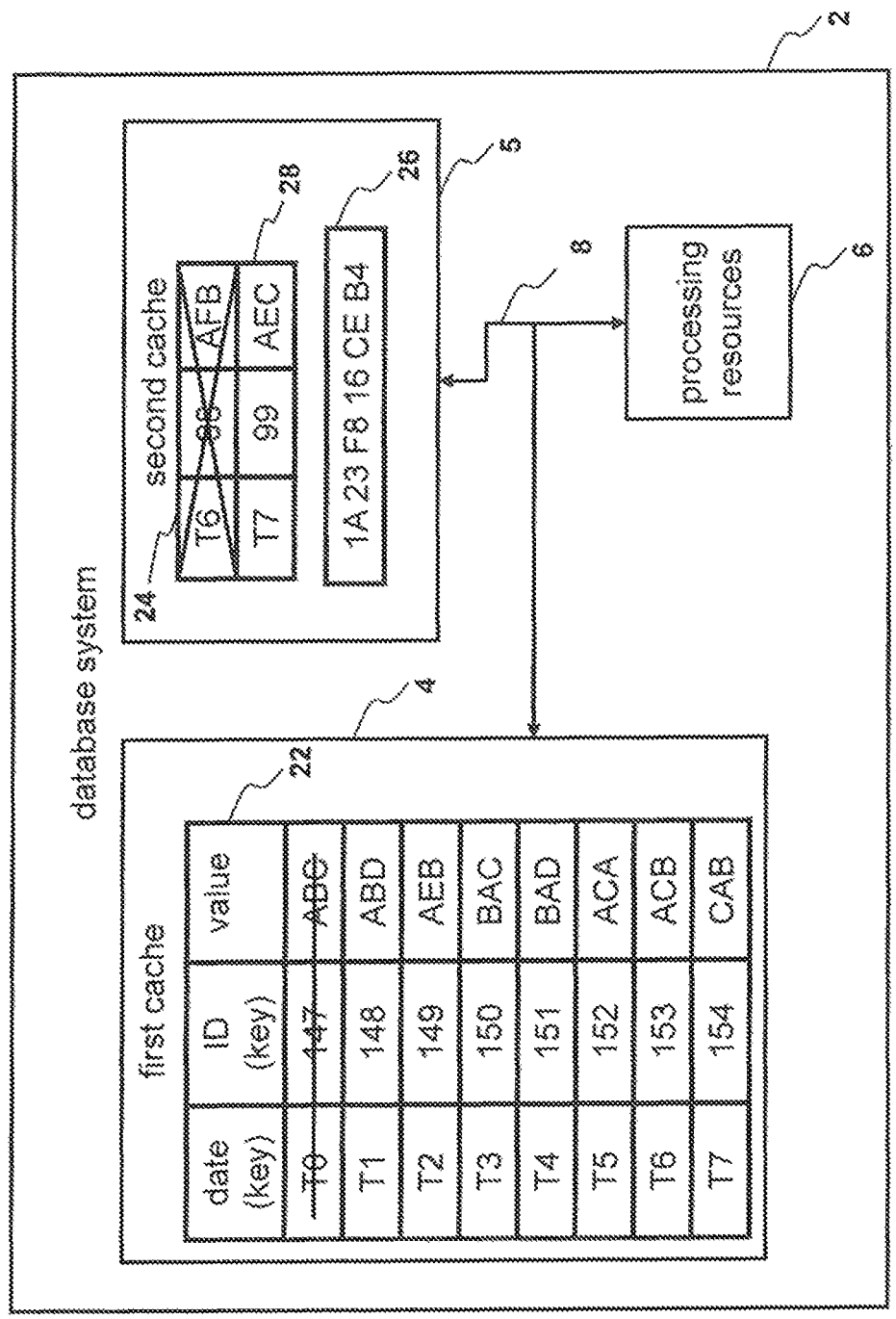
FIG. 6 relates to a further particular example of data processing utilizing the first and second cache.

In some embodiments, with continued reference to FIGS. 5 and 6, processing the key-value data 22 the further key-value data 22 and the aggregated data 24 stored in the second cache 5 to form updated aggregated data 24 comprises updating at least one aggregation result 28 such as a sum, an average, or a standard deviation, by additionally incorporating the further key-value data into the at least one aggregation result. In some of these embodiments, the second cache 5 includes data aggregation control information 26 and incorporating the further key-value data 22 into the at least one aggregation result 28 is based on the data aggregation control information 26.

In a simplified example for illustrating purposes, the aggregation (activity/function 16 in FIG. 2) includes calculating an arithmetic mean value A of a number n of input values an which are part of the key-value data 22. In previous iterations, n input values an (e.g. the key-value data given by date T0 to T6 in FIG. 5) have been included in the mean value A, forming the aggregation result 28 of the previous iterations. At the beginning of a current iteration, at date T7, the aggregation cache 5 thus stores the mean value A (=aggregated data 24) as well as the number of input value n (=aggregation control information 26). In the current iteration, a further number x of new input values ax are additionally included in the mean value A, without re-calculating A entirely using all previous n input values an from the previous iterations, but only on the basis of the data stored by the aggregation cache 5 and the key-value data 22 newly generated in the current iteration. This is facilitated by the aggregation control information 26 as an updated mean value A' (exemplarily indicated by value AEA in the second cache 5 of FIG. 5, identified by date T7 and ID 99) is given by calculating the sum of A and the new input values ax of the current iteration divided by n+x, forming the updated aggregation result 28 of the current processing iteration.

The specificities of the aggregation control data 26 depend on the specificities of the aggregation. Generally, the aggregation control data 26 includes all data which is required to update the aggregated data 24 solely by using the current aggregated data 24 and the newly generated key-value data 22, without having to rely on previous key-value data 22 from previous iterations. For some aggregations (such as count), this may be possible without any aggregation control data 26.

In some embodiments, still with reference to FIG. 5, the aggregated data 24 in the aggregation cache 5 is updated in each iteration on the basis of the key-value data 22 generated in the given iteration and the data kept in the aggregation cache 5 (i.e. the aggregated data 24 and, optional, the aggregation control data 26), as described above, until a final iteration. As a non-limiting use-case, this may apply to the technical domain of image processing where each line of pixels of the image to be processed constitutes a set of input data records processed in one iteration, and each iteration yields some aggregated image processing output data which is maintained in the aggregation cache 5. Hence, in this case, there is one iteration per image line and the iterative processing concludes after the last line of the image has been processed. At this point, the aggregated data 24 stored in the aggregation cache 5 forms the final image processing output data of the image processing.

Depending on the particular use-case, these embodiments may also include an additional activity/function in some or all of the iterations of purging any key-value data 22 from the key-value cache 4 which is not needed to perform the remainder of the iterative processing, i.e. in subsequent iterations, in order to relieve the memory of the database system 2. As mentioned above, key-value data 22 may still be usefully be stored in the key-value cache 4 for further reasons, although updating the aggregated data 24 in subsequent iterations may be performed without using the key-value data 22 from previous iterations. Thus, the decision which key-value data 22 may or may not be purged during a given iteration may also take into account these further technical considerations, such as to which extent the key-value cache 4 may serve as a backup repository in order to restore the aggregated data in case of a technical failure state at the aggregation cache 5.

In some embodiments, now with reference to FIG. 6, updating the at least one aggregation result 24 comprises excluding outdated key-value data 22 from the at least one aggregation result 28 using the outdated key-value data stored in the first cache and deleting the outdated key-value data from the first cache. In some of these embodiments, the second cache 5 includes data aggregation control information 26 (as already introduced above) and excluding the outdated key-value data from the at least one aggregation result 28 is based on the data aggregation control information 26. These embodiments facilitate processing use-cases which do not aggregate all key-value data 22 from all processing iterations, but only portions of the key-value data 22.

For example, aggregation may form a sliding window over the key-value data 22 from the various iterations, where key-value data 22 of a given number m of iterations forms the aggregation basis. Thus, in a current iteration i, key-value data 22 from the iterations i–m to i are to be included in the aggregation result 28 of the current iteration, and any older key-value data is excluded from the aggregation result 28.

With continuing reference to the simplified arithmetic mean value A mentioned above and FIG. 6, the given number m of iterations to be considered may be 7. Hence, according to FIG. 6, in the previous iteration at date T6, the key-value data sets from dates T0 to T6 and IDs 147 to 153 formed the aggregation result 28 stored in the aggregation cache 5 (in the example of FIG. 6, the value AFB with date T6 and ID 98, also briefly referred to as aggregation result A as introduced above). In the current iteration at date T7, according to the sliding window, the key-value data with date T0 becomes outdated and is to be replaced in the aggregation result 28 by the new key-value data generated in the current iteration (date T7, ID 154, value CAB in the example of FIG. 6). The given number m of iterations may be stored in the aggregation cache 5 as part of the aggregation control data 26. Excluding the outdated key-value data (date T0, ID 147, value ABC) from the mean value currently stored in the aggregation cache is facilitated by having maintained the key-value data 22 from the previous iterations in the key-value cache 4. Specifically, updating the aggregated data 24 in the aggregation cache 5 without completely re-calculating the aggregated data 24 is implemented in the given example by calculating the sum of A plus the value of the new key-value data (CAB, date T7, ID 154) minus the outdated key-value data (ABC, date T0, ID 147) and division by the number m of iterations considered, or briefly $A'=(A+CAB-ABC)/7=AEC$. The current aggregation data 24 stored in the aggregation cache 5 is updated from date=T6, ID=98, value=AFB to date=T7, ID=99, value=AEC. Accordingly, as the outdated key-value data (ABC, date T0, ID 147) is not used in the aggregations of subsequent iterations, the outdated key-value data is deleted from the key-value cache 4 in these embodiments.

A use-case for such sliding window embodiment is again the technical domain of image processing. For example, object detection within an image can be implemented by having run a sliding window of a given size (or multiple sliding windows of varying sizes) over an image and analyzing (changing) image characteristics within the sliding window, the latter one involving the aggregation activity/function 18 as described above.

Note that FIGS. 5 and 6 are simplified examples showing only one set of key-value data 22 and related aggregated data 24 in the first cache 4 and the second cache 5, respectively, for illustrative purposes. In practice, multiple set of key-value data 22 and corresponding aggregated data 24 may be stored in first cache 4 and the second cache 5. For example, multiple images may be processed concurrently with respective pluralities of image lines being kept in the first cache 4 and corresponding aggregated image data being kept in the second cache 5. In order to differentiate between the individual sets of key-value data 22 and aggregated data 24 and in order to link a corresponding set of key-value data 22 in the first cache 4 to the aggregated data 24 in the second cache 5, additional identification/key information may be present (either in dedicated columns or included in the ID column), identifying e.g. the image to which the image line data and the aggregated image data belong.

Another example use case for the computational mechanisms discussed above is the processing of Passenger Name Record (PNR) data representing items such as travel-related products and services, as well as the purchasers of such items. A PNR may contain data defining one or more flights (e.g. by origin and destination location, date and time, airline identification and the like) as well as the traveller or travellers (e.g. by name, date of birth and the like) taking such flights. A system implemented according to the principles above can be configured to process a set of PNR data, for example the previous 40 days of PNR data, on a daily basis (although as noted earlier, various other frequencies of operation are also contemplated).

Therefore, the system can, at any given instance of the processing method, generate key-value data that corresponds to the most recent subset of PNR data (e.g. the current day). The generated key-value data can be stored in the first cache 4, along with previously-generated key-value data for a previous 39 days. The key-value data can include any of a wide variety of features extracted from the PNR data. Examples of such features include a total price of an itinerary defined in a PNR record, a determination of the portion of a day (e.g. morning, afternoon or evening) during which the flights departed, a city of residence of a passenger, and the like.

The key-value data and previously generated aggregated data from the second cache 5 can then be processed to generate updated aggregated data for storage in the second cache 5 and for provision to the client devices 7. An example of the aggregated data includes an average total itinerary price (e.g. correlated with passenger city of residence). A further example of the aggregated data includes a correlation between itinerary price and time of day, e.g. across the previous 40 days of PNR data. Various other PNR features and aggregated metrics will also occur to those skilled in the art.

A further example use case for the computational mechanisms discussed above is the processing of a message feed associated with the above-mentioned travel products and services. For example, a system implemented according to the principles discussed herein can be configured to receive as input data a set of messages effecting purchases, changes, payments and the like to travel-related products and services (e.g. flights, hotel reservations and the like). The messages may be, for example formatted according to the New Distribution Capability (NDC) standard. More specifically, the input data can include a set of NDC Order messages, such as a collection of all such messages processed during one day.

Processing of the input data in this use case can include extracting features for storage as key-value data in the first cache 4, including for example a type of action represented by a message (e.g. an initial purchase, a cancellation, initiation of payment, and the like). Other examples of features extracted from such input data include an identifier of the originator of the message (e.g. a travel agency or other suitable entity), an indicator of a payment method used to complete a purchase, and the like.

The key-value data mentioned above and previously generated aggregated data from the second cache 5 can then be processed to generate updated aggregated data for storage in the second cache 5 and for provision to the client devices 7. Examples of aggregated data derived from the key-value data can include an average number of messages received per itinerary for each originator identifier, a ranking of payment methods from most common to least common, and the like.

The mechanisms described above constitute a combination of Big Data and MapReduce data processing technologies. They facilitate distributed caching and a use of adapted compression data formats. The mechanisms can employ data organizations and file formats as exemplarily outlined above which are optimized for temporal and structured data, such as line-wised processed images which are processed iteratively, successive line in time. Compared with sequential processing not utilizing the cache structure described herein, a significant processing time speedup can be gained (according to real-life test conducted by the Applicant, from 3 hours and 30 minutes down to only 17 minutes for the same input data with the same hardware). Likewise, more data can be processed during same time window with the same hardware. The described cache structure and data/file organization embodiments also allow for a reduced disk footprint, according to real-life test conducted by the Applicant from 14 GB to 3.5 GB per day for the same input data. The iterative processing described above also facilitates resiliency. As processing is divided by iterations, processing errors in one iteration do not compromise processing results from previous iterations.

Figure 7:
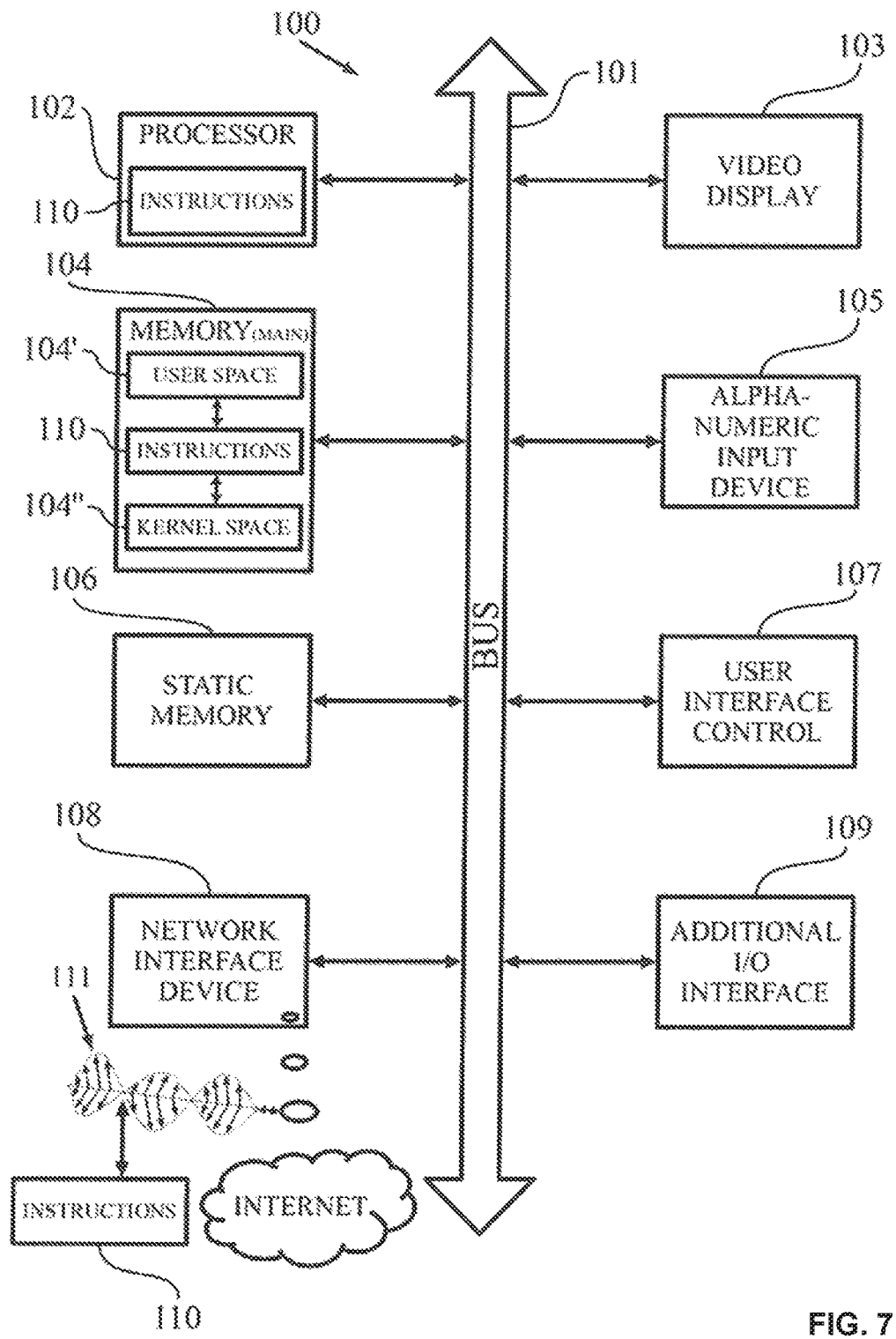
FIG. 7 illustrates an exemplary computer system implementing a database system or database system node arranged to perform the mechanisms described herein.

Finally, FIG. 7 is a diagrammatic representation of a computer system 100 which provides the functionality of the database system 2 as shown in FIG. 1, implementing the activities/functions as described above including hosting the first cache 4 and the second cache 5. Within the database system 2, a set of instructions 110, to cause the computer system 100 to perform any of the methods discussed herein, may be executed. The computer system 100 includes at least one processor 102 (implementing the computation nodes 6 as explained above), a main memory 104 and a network interface device 108. The main memory 104 includes a user space 104', which is associated with user-run applications, and a kernel space 104", which is reserved for an operating system, as well as operating-system- and hardware-associated applications. The computer system components 102 to 109 are interconnected by a data bus 101 (implementing the interface 8). Optionally, the computer system 100 may further include a static memory 106, e.g. non-removable flash and/or solid-state drive and/or a removable Micro or Mini SD card, which permanently stores software enabling the computer system 100 to execute functions of the computer system 100 and an additional I/O interface 109, such as card reader and USB interfaces may be present. Optionally, the computer system 100 may include a video display 103, a user interface control module 107 and/or an alphanumeric input device 105. The network interface device 108 connects the database system 2 to other stations, including the input data source 3 and the clients 7, the Internet and/or any other network. Computer system 100 may also represent only a portion of the database system 2 in the case the database system 2 is distributed across several computer systems 100 interconnected by a network via the network interface device 108. A set of instructions (i.e. software) 110 embodying any one, or all, of the methods described above, resides completely, or at least partially, in or on a machine-readable medium, e.g. the main memory 104 and/or the processor 102. The software 110 may further be transmitted or received as a propagated signal 111 via the Internet through the network interface device 108.

In general, the routines executed to implement the embodiments of the invention, whether implemented as part of an operating system or a specific application, component, pro-gram, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used, such terms are intended to be inclusive in a manner similar to the term "comprising".

While all of the invention has been illustrated by a description of various embodiments and while these embodiments have been described in considerable detail, it is not the intention to restrict or in any way limit the scope to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A method for iteratively processing data in a database system, the method comprising:
    storing, in a first cache of the database system, previous key-value data derived from previous input data received at the database system from an input data source;
    storing, in a second cache of the database system, previous aggregated data generated from the previous key-value data stored in the first cache;
    receiving, at the database system from the input data source, a further input data set in a sequence of input data sets;
    at a processor of the database system, executing a Map operation of a MapReduce process for transforming the further input data into further key-value data and;
    storing the further key-value data in the first cache with the previous key-value data;
    retrieving the further key-value data from the first cache, exclusive of at least a portion of the previous key-value data;
    retrieving the previous aggregated data from the second cache;
    at the processor, executing a Reduce operation of the MapReduce process for processing the retrieved further key-value and the retrieved aggregated data to generate updated aggregated data;
    prior to receiving a next input data set in the sequence of input data sets, replacing the previous aggregated data in the second cache with the updated aggregated data; and
    providing the updated aggregated data to at least one client.

2. The method of claim 1, wherein the key-value data and the further key-value data stored in the first cache is organized sequentially in that the key comprises a creation date of the respective key-value data record.

3. The method of claim 1, wherein processing the further key-value data in the first cache and the aggregated data stored in the second cache to form the updated aggregated data comprises updating at least one aggregation result by additionally incorporating the further key-value data into the at least one aggregation result; wherein the at least one aggregation result is selected from the group consisting of: a sum, an average, and a standard deviation.

4. The method of claim 3, wherein the second cache includes data aggregation control information and wherein incorporating the further key-value data into the at least one aggregation result is based on the data aggregation control information.

5. The method of claim 3, wherein updating the at least one aggregation result comprises excluding, in addition to the excluded portion of the previous key-value data, outdated key-value data from the at least one aggregation result using the outdated key-value data stored in the first cache, and deleting the outdated key-value data from the first cache.

6. The method of claim 5, wherein excluding the outdated key-value data from the at least one aggregation result is based on the data aggregation control information.

7. The method of claim 1, wherein the input data includes at least one of (i) Passenger Name Record (PNR) data, or (ii) a message feed including New Distribution Capability (NDC) Order messages.

8. A database system comprising:
a first cache storing previous key-value data derived from previous input data received at the database system from an input data source;
a second cache storing aggregated data generated from the previous key-value data stored in the first cache; and
a processor configured to:
receive a further input data set in a sequence of input data sets;
execute a Map operation of a MapReduce process to transform the further input data into further key-value data;
store the further key-value data in the first cache with the previous key-value data;
retrieving the further key-value data from the first cache, exclusive of at least a portion of the previous key-value data;
retrieving the previous aggregated data from the second cache;
at the processor, executing a Reduce operation of the MapReduce process to
process the retrieved further key-value data and the retrieved aggregated data to generate updated aggregated data,
prior to receiving a next input data set in the sequence of input data sets, replace the previous aggregated data in the second cache with the updated aggregated data; and
provide the updated aggregated data to at least one client.

9. The database system of claim 8, wherein the key-value data and the further key-value data stored in the first cache is organized sequentially in that the key comprises a creation date of the respective key-value data record.

10. The database system of claim 8, wherein the processor is further configured, in order to process the further key-value data in the first cache and the aggregated data stored in the second cache to form the updated aggregated data, to: update at least one aggregation result by additionally incorporating the further key-value data into the at least one aggregation result; wherein the at least one aggregation result is selected from the group consisting of: a sum, an average, and a standard deviation.

11. The database system of claim 10, wherein the second cache includes data aggregation control information and wherein the database system is further arranged to incorporate the further key-value data into the at least one aggregation result based on the data aggregation control information.

12. The database system of claim 10, wherein the processor is further configured, in order to update the at least one aggregation result, to: exclude, in addition to the excluded portion of the previous key-value data, outdated key-value data from the at least one aggregation result using the outdated key-value data stored in the first cache; and delete the outdated key-value data from the first cache.

13. The database system of claim 12, wherein the processor is further configured to exclude the outdated key-value data from the at least one aggregation result based on the data aggregation control information.

14. The database system of claim 8, wherein the input data includes at least one of (i) Passenger Name Record (PNR) data, or (ii) a message feed including New Distribution Capability (NDC) Order messages.

15. A non-transitory computer program product comprising program code instructions stored on a computer readable medium for execution by a database system to:
store, in a first cache of the database system, previous key-value data derived from previous input data received at the database system from an input data source;
store, in a second cache of the database system, previous aggregated data generated from the previous key-value data stored in the first cache;
receive, at the database system from the input data source, a further input data set in a sequence of input data sets;
at a processor of the database system, execute a Map operation of a MapReduce process for transforming the further input data into further key-value data;
store the further key-value data in the first cache with the stored previous key-value data which;
retrieve the further key-value data from the first cache, exclusive of at least a portion of the previous key-value data;
retrieve the previous aggregated data from the second cache;
at the processor, execute a Reduce operation of the MapReduce process to
process the retrieved further key-value data and the retrieved aggregated data to generate updated aggregated data,
prior to receiving a next input data set in the sequence of input data sets, replacing the previous aggregated data in the second cache with the updated aggregated data in the second cache for usage in further iterations; and
provide the updated aggregated data to at least one client.

* * * * *